United States Patent
Forster

(10) Patent No.: US 6,907,962 B2
(45) Date of Patent: Jun. 21, 2005

(54) HYDROSTATIC AXIAL PISTON MACHINE WITH A SWASHPLATE DESIGN

(75) Inventor: Franz Forster, Karlstadt-Mühlbach (DE)

(73) Assignee: Linde Aktiengesellschaft (DE)

( * ) Notice: Subject to any disclaimer, the term of this patent is extended or adjusted under 35 U.S.C. 154(b) by 553 days.

(21) Appl. No.: 10/002,964

(22) Filed: Nov. 2, 2001

(65) Prior Publication Data

US 2002/0069752 A1 Jun. 13, 2002

(30) Foreign Application Priority Data

Nov. 8, 2000 (DE) .......................................... 100 55 261

(51) Int. Cl.[7] .............................................. F16D 55/36
(52) U.S. Cl. ...................... 188/71.5; 188/170; 188/72.3
(58) Field of Search ................................ 188/71.5, 170, 188/72.3; 475/72, 78, 331, 83, 346; 92/26; 417/314; 180/305

(56) References Cited

U.S. PATENT DOCUMENTS

| | | | | |
|---|---|---|---|---|
| 5,391,122 A | * | 2/1995 | Forster | 475/72 |
| 5,391,123 A | * | 2/1995 | Forster | 475/83 |
| 5,624,340 A | * | 4/1997 | Forster | 475/72 |
| 6,145,635 A | * | 11/2000 | White | 188/170 |
| 6,334,512 B1 | | 1/2002 | Forster | 188/71.5 |

FOREIGN PATENT DOCUMENTS

| | | | |
|---|---|---|---|
| DE | 4235697 | * | 3/1994 |
| DE | 4432136 | * | 3/1996 |
| DE | 198 54 415 A1 | | 2/2000 |
| DE | 19849334 | * | 4/2000 |

* cited by examiner

Primary Examiner—Robert A. Siconolfi
Assistant Examiner—Devon Kramer
(74) Attorney, Agent, or Firm—The Webb Law Firm

(57) ABSTRACT

A hydrostatic axial piston machine has a swashplate, a cylinder block, a cylinder block bearing system, a brake to arrest the cylinder block, and a compensation device to relieve the cylinder block bearing system from axial engine forces. The compensation device is integrated into the brake. The brake has a brake piston loaded in the closing direction by a spring and has a relieving surface which acts in the opening direction and can be pressured by hydraulic pressure and is active opposite to the axial engine forces. The cylinder block bearing system has two helical roller bearings in an O-arrangement and the brake piston is an annular piston located axially between the helical roller bearings. A retaining ring of the spring is supported against the inner ring of a helical roller bearing provided to absorb axial engine forces.

11 Claims, 1 Drawing Sheet

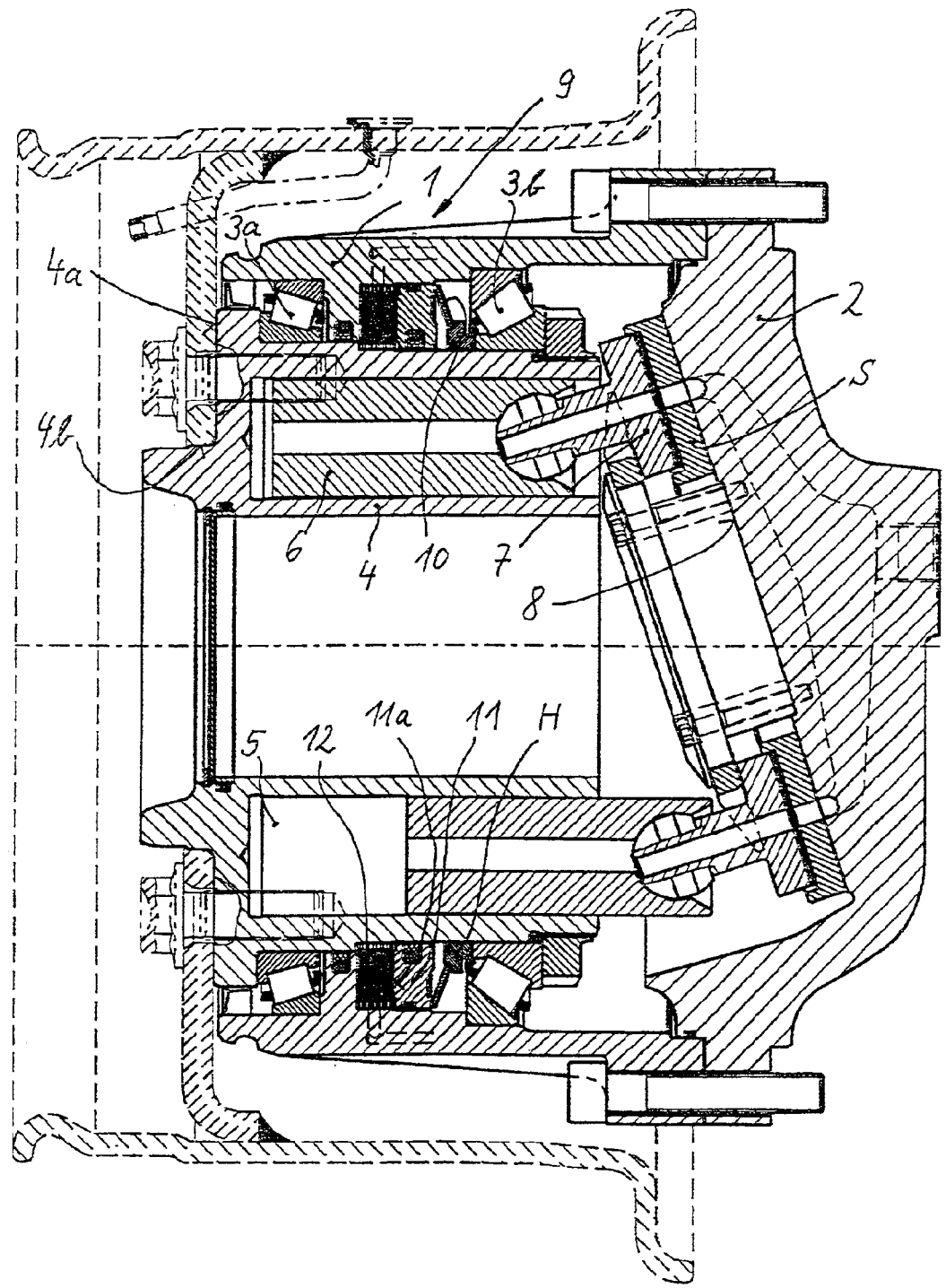

HYDROSTATIC AXIAL PISTON MACHINE WITH A SWASHPLATE DESIGN

CROSS-REFERENCE TO RELATED APPLICATION

This application corresponds to German Application No. 100 55 261.7 filed Nov. 8, 2000, herein incorporated by reference in its entirety.

BACKGROUND OF THE INVENTION

1. Field of the Invention

This invention relates generally to hydrostatic axial piston machines and, more particularly, to a hydrostatic axial piston machine having a swashplate design with a cylinder block, a cylinder block bearing system, a brake to arrest the cylinder block, and a compensation device to at least partly relieve the cylinder block bearing system of axial engine forces.

2. Technical Considerations

DE 198 54 415 A1 describes a generic axial piston machine. In that case, the cylinder block has an external bearing system to achieve compact dimensions. In a first embodiment, the cylinder block bearing system is large enough such that axial engine forces are completely absorbed by the cylinder block bearing system. In a second embodiment, a device for the compensation of axial forces is installed in the space provided by the external bearing system of the cylinder block, which space is delimited radially outward by the cylinder bores. The cylinder block bearing system can, therefore, be sized smaller because it only needs to absorb the radial engine forces and engine moments (as well as, in the exemplary embodiment, the external wheel forces and moments that occur).

While the structure and operation of this axial piston machine is generally adequate, improvements could be made. Therefore, it is an object of the present invention to provide an axial piston machine of the general type described above but that is more compact and more economical to manufacture.

SUMMARY OF THE INVENTION

The invention provides an axial piston machine having a compensation device that is integrated into the brake. The presence of the compensation device makes it possible to size the cylinder block bearing system smaller than in conventional axial piston machines having conventional external or internal bearing systems of the cylinder block in which all the engine forces and moments must be absorbed by the cylinder block bearing system. As a result of the integration of the compensation device into the brake, no additional installation space is required.

In one advantageous configuration of the invention, the brake is provided with a brake piston that is loaded or biased by a spring in the closing direction of the brake. The brake piston has a relieving surface that can be pressurized by hydraulic pressure in the opening direction that acts opposite to the axial engine forces. Therefore, in addition to its core function, which is to release a spring-loaded device to release the brake, it is, therefore, also used to compensate for axial forces.

The axial piston machine of the invention can have an internal bearing system or an external bearing system of the cylinder block. In the first case, the cylinder block bearing system can be located radially between the cylinder block and a surrounding housing. In the second case, the cylinder block bearing system can be located radially between a central axle end and the cylinder block.

With regard to compact dimensions, it is particularly advantageous if the cylinder block bearing system has two helical roller bearings in an O-arrangement which are fastened in a housing that surrounds the cylinder block. It is also advantageous if the brake piston is an annular piston located axially between the helical roller bearings, whereby a retaining ring of the spring is supported on the inner ring of a helical roller bearing provided to absorb axial engine forces and the brake piston, at a maximum deflection, is in contact with the retaining ring. The cylinder block bearing system is thereby centrally relieved with the help of the brake pneumatic pressure. All that the cylinder block bearing system has to absorb is the moment that is caused by the eccentricity of the resulting axial engine force, which is, however, compensated by the compensation device.

The brake can be a wet, multiple-disc brake. The heat generated in the brake can thereby be easily discharged as a result of which the brake can absorb high braking energies. This type of construction is, therefore, particularly compact. If the axial piston machine is located in a hub drive, in particular in a wheel hub drive in which the housing forms a stationary hub carrier, the cylinder block forms a rotating hub, and the cylinder block bearing system forms a hub bearing system, there are additional advantages with regard to the low cost of manufacture and compact dimensions. In this case, it is advantageous if the cylinder block is provided with a wheel fastening flange and a rim centering device.

In one advantageous embodiment of the invention in which the axial piston machine is configured as a wheel drive, the invention teaches that a swashplate can be located and oriented so that under operating conditions the radial engine forces are directed opposite to the forces that act from the outside on the cylinder block bearing system. There is thus an additional relief of the cylinder block bearing system, whereby the useful life of the bearing system can be increased and/or the bearing dimensions can be reduced.

Additional advantages and details of the invention are described below with reference to the exemplary embodiment illustrated in the accompanying schematic diagram.

BRIEF DESCRIPTION OF THE DRAWING

The FIGURE is a sectional view of an exemplary axial piston machine of the invention having a swashplate construction with a constant intake volume and, in the illustrated exemplary embodiment, is in the form of a wheel drive.

DESCRIPTION OF THE PREFERRED EMBODIMENT

An exemplary axial piston machine incorporating features of the invention will now be described with particular reference to use in a wheel drive system. However, it is to be understood that the invention is not limited to wheel drive systems. With reference to the drawing FIGURE, an exemplary axial piston machine has a housing 1 and a swashplate 2 connected to the housing 1. The housing 1 forms a stationary hub carrier that can be fastened to a component (frame, axle, etc.) that is firmly and permanently fastened to the vehicle.

A cylinder block 4 is located radially inside the housing 1 by means of a cylinder block bearing system having two helical roller bearings 3a and 3b (preferably conical roller bearings) in an O-arrangement. The cylinder block 4 forms the rotating hub of the wheel drive. A wheel fastening flange 4a and a rim centering device 4b are formed on the cylinder block 4.

The cylinder block 4 has concentric cylinder bores 5, in each of which a reciprocating piston 6 can move longitudinally and is supported by means of a slipper 7 and a control cam S on a running surface 8 of the swashplate 2. There are hydraulic fluid channels provided in the swashplate 2 and the slippers 7, as well as in the reciprocating piston 6, so that the cylinder bores 5 can be supplied with hydraulic fluid. The hydraulic fluid channels are connected to supply channels in the swashplate 2.

A brake 9 is located radially between the cylinder block 4 and the housing 1. In one embodiment, the brake 9 is a spring-loaded brake. This brake 9 can be pressurized by the force of a belleville spring washer 10 in the closing direction and can be hydraulically released by a ring-shaped brake piston 11. The spring-loaded brake 9 can have a multiple disc package 12, the individual discs of which are coupled alternatively with the housing 1 and with the cylinder block 4.

The invention teaches that a compensation device for the at least partial compensation of axial engine forces of the axial piston machine is integrated or incorporated into the brake 9. For this purpose, the brake 9 with the belleville spring washer 10 and brake piston 11 is located axially between the two helical roller bearings 3a and 3b. The brake piston 11 has a hydraulically pressurized relieving surface 11a, the direction of action of which is opposite to the direction of action of the belleville spring washer 10. In this case, the belleville spring washer 10 is supported by a retaining ring H on the inner ring of the helical roller bearing 3b (on the right in the FIGURE), which is provided to absorb axial engine forces. When the space in which the disc package 12 is located is pressurized with sufficient brake pneumatic pressure, which is applied to the relieving surface 11a of the brake piston 11, the brake 9 is released. The axial force thereby acting on the brake piston 11 is directed opposite to the axial engine forces because the brake piston 11 first presses against the belleville spring washer 10 and then, as it continues to move to the right in the FIGURE and at its maximum deflection, presses against the retaining ring H, which is supported on the inner ring of the helical roller bearing 3b.

The compensation device of the invention provides a central relief of the cylinder block bearing system. Because the resulting axial engine force is applied eccentrically, there remains a tipping moment that acts on the cylinder block 4 and is absorbed by the cylinder block bearing system.

The hydraulic pressure applied to the relieving surface 11a of the brake piston 11 to release the brake 9 can be constant or can be a function of the high pressure in the axial piston machine. In the latter case, there can be a proportionality between the high pressure and the pressure that acts on the relieving surface 11a. The axial engine forces, apart from a moment generated by the above-mentioned eccentricity, can be completely or almost completely compensated.

Because in the exemplary embodiment illustrated and described above the hydrostatic axial piston machine of the invention is used in a wheel drive, the cylinder block bearing system also serves as the wheel bearing system. The helical roller bearings 3a and 3b, in addition to the sum of the engine moments (caused by radial engine forces and the eccentricity of the resulting axial engine force) and the residual radial engine forces, also absorb the external forces generated by the wheel load.

In this case, it is advantageous if the swashplate 2, as shown in the FIGURE, is located and oriented so that the radial engine forces (separation of forces on the running surface 8 of the swashplate 2) oppose the wheel forces that are exerted from outside on the cylinder block bearing system and, thus, relieve the cylinder block bearing system.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic axial piston machine, comprising:
   a swashplate;
   a cylinder block;
   a cylinder block bearing system comprising two bearings;
   a brake configured to arrest the cylinder block; and
   a compensation device configured to at least partially relieve the cylinder block bearing system from axial engine forces, wherein the compensation device is integrated into the brake, wherein the compensation device is located axially between the bearings.

2. The hydrostatic axial piston machine as claimed in claim 1, wherein the brake includes a brake piston that is loaded by a spring in a closing direction of the brake, and wherein the brake piston has a relieving surface which can be pressurized by hydraulic pressure and acts in an opening direction of the brake and is effective opposite to the axial engine forces.

3. The hydrostatic axial piston machine as claimed in claim 1, wherein the brake is a wet, multiple-disc brake.

4. The hydrostatic axial piston machine as claimed in claim 2, wherein the axial piston machine is located in a hub drive, wherein the housing forms a stationary hub carrier, the cylinder block forms a rotating hub, and the cylinder block bearing system forms a hub bearing system.

5. The hydrostatic axial piston machine as claimed in claim 4, wherein the cylinder block includes a wheel fastening flange and a rim centering device.

6. The hydrostatic axial piston machine as claimed in claim 4, wherein the swashplate is located and oriented such that radial engine forces under operating conditions are active opposite to the forces acting from outside on the cylinder block bearing system.

7. The hydrostatic axial piston machine as claimed in claim 4, wherein the hub drive is a wheel hub drive.

8. The hydrostatic axial piston machine as claimed in claim 5, wherein the swashplate is located and oriented such that radial engine forces under operating conditions are active opposite to the forces acting from outside on the cylinder block bearing system.

9. The hydrostatic axial piston machine as claimed in claim 1, wherein the bearings are helical roller bearings.

10. The hydrostatic axial piston machine as claimed in claim 9, wherein the brake comprises a spring washer and a brake piston having a relieving surface, and
    wherein the spring washer is supported on a retaining ring.

11. A hydrostatic axial piston machine, comprising:
    a swashplate;
    a cylinder block;
    a cylinder block bearing system;

a brake configured to arrest the cylinder block; and a compensation device configured to at least partially relieve the cylinder block bearing system from axial engine forces, wherein the compensation device is integrated into the brake, wherein the brake includes a brake piston that is loaded by a spring in a closing direction of the brake, and wherein the brake piston has a relieving surface which can be pressurized by hydraulic pressure and acts in an opening direction of the brake and is effective opposite to the axial engine forces, and wherein the cylinder block bearing system includes two helical roller bearings, wherein the roller bearings are fastened in a housing that surrounds the cylinder block, wherein the brake piston is an annular piston located axially between the helical roller bearings, wherein a retaining ring of the spring is supported on an inner ring of one of the helical roller bearings provided to absorb axial engine forces, and wherein the brake piston at maximum deflection contacts the retaining ring.

* * * * *